(12) United States Patent
Lin

(10) Patent No.: US 11,619,845 B2
(45) Date of Patent: Apr. 4, 2023

(54) DISPLAY DEVICE AND METHOD OF MANUFACTURING THEREOF

(71) Applicant: AU OPTRONICS CORPORATION, Hsin-Chu (TW)

(72) Inventor: Shih-Ping Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 332 days.

(21) Appl. No.: 16/931,673

(22) Filed: Jul. 17, 2020

(65) Prior Publication Data

US 2021/0088847 A1 Mar. 25, 2021

(30) Foreign Application Priority Data

Sep. 24, 2019 (TW) ................................. 108134444

(51) Int. Cl.
*G02F 1/13357* (2006.01)
*G02F 1/1335* (2006.01)
*G02B 26/00* (2006.01)

(52) U.S. Cl.
CPC ..... *G02F 1/133606* (2013.01); *G02B 26/007* (2013.01); *G02F 1/133514* (2013.01)

(58) Field of Classification Search
CPC ........ G02F 1/355; G02F 1/01; G02F 2202/28; G02F 1/133606; G02F 1/133514; G02B 26/007

See application file for complete search history.

(56) References Cited

U.S. PATENT DOCUMENTS

| 2015/0241621 | A1* | 8/2015 | Inui | G02F 1/133371 |
| | | | | 349/65 |
| 2019/0093008 | A1 | 3/2019 | Shin et al. | |
| 2019/0318688 | A1* | 10/2019 | Kondo | G09G 3/3225 |
| 2020/0325363 | A1* | 10/2020 | Jung | C09B 67/0063 |
| 2021/0074956 | A1* | 3/2021 | Li | H01L 51/56 |

FOREIGN PATENT DOCUMENTS

| CN | 201010146357.8 | | 4/2010 | |
| CN | 109073933 | A | 12/2018 | |
| JP | 2015-121088 | | 6/2015 | |
| KR | 1020090073577 | | 8/2009 | |
| WO | WO-2017108325 | A1 * | 6/2017 | ............ C08F 220/18 |
| WO | WO-2017183854 | A1 * | 10/2017 | ............ B32B 27/08 |

OTHER PUBLICATIONS

Translation of WO2017108325A1 (Year: 2017).*
Translation of WO2017183854 A1 (Year: 2017).*
CNIPA has issued the Office Action for the corresponding China application dated May 19, 2021.

* cited by examiner

*Primary Examiner* — Lixi C Simpson
(74) *Attorney, Agent, or Firm* — WPAT, PC

(57) ABSTRACT

This disclosure relates to a display device which includes a light transmissible layer and a second material. The light transmissible layer includes a first material, wherein the first material generates a first color transformation from a first color to a second color after being exposed under a light of the first wavelength range. The second material is either included in the light transmissible layer or has a projective area overlapped with the light transmissible layer. The second material generates a second color transformation from the second color to the first color after being exposed under a light of the first wavelength range.

19 Claims, 5 Drawing Sheets

DISPLAY DEVICE AND METHOD OF MANUFACTURING THEREOF

BACKGROUND OF THE INVENTION

1. Field of the Invention

The present disclosure relates to a display device and a method of manufacturing thereof, specifically, a display device generating color change by light irradiation and a method of manufacturing thereof.

2. Description of the Prior Art

In recent years, various types of display devices are widely used in our lives. For example, televisions, personal computers, mobile phones, video games, vehicle devices, etc. all use display devices. Along with the development of technology, the user's requirements for visual effect also increase.

Due to the demands for using some display devices outdoors (for example, mobile phones, wearable devices, and vehicle devices), they might be irradiated by sunlight for a long time. However, materials in some display devices, such as optical glue films connecting display panels and touch panels, and polarizers of display panels, might deteriorate or discolor due to being irradiated by sunlight. In addition to being irradiated by sunlight, display devices might also deteriorate or discolor due to the inner backlight or other light. However, deterioration and discoloration of these materials are easily discovered by users and further affect the appearance of the products and the display effects.

SUMMARY OF THE INVENTION

The present disclosure provides a display device and a method of manufacturing thereof so as to decrease the effects of inner color change on the visual effect or display effect of the product due to light irradiation.

In an embodiment, the display device includes a light transmissible layer and a second material. The light transmissible layer includes a first material; wherein, the first material is configured to generate a first color transformation from a first color to a second color after being exposed under a light of the first wavelength range. The second material is either included in the light transmissible layer or has a projection area on the light transmissible layer at least partially overlapped with the light transmissible area. The second material is configured to generate a second color transformation from the second color to the first color after being exposed under a light of the first wavelength range.

In another embodiment, a method of manufacturing a display device includes: disposing a light transmissible layer which includes a first material; wherein, the first material is configured to generate a first color transformation from a first color to a second color after being exposed under a light of the first wavelength range; disposing a second material in the transmissible layer or disposing a second material to have its projection area at least partially overlap with the light transmissible layer, wherein the second material is configured to generate a second color transformation from the second color to the first color after being exposed under a light of the first wavelength range.

DETAILED DESCRIPTION OF THE PREFERRED EMBODIMENT

Figure 1:
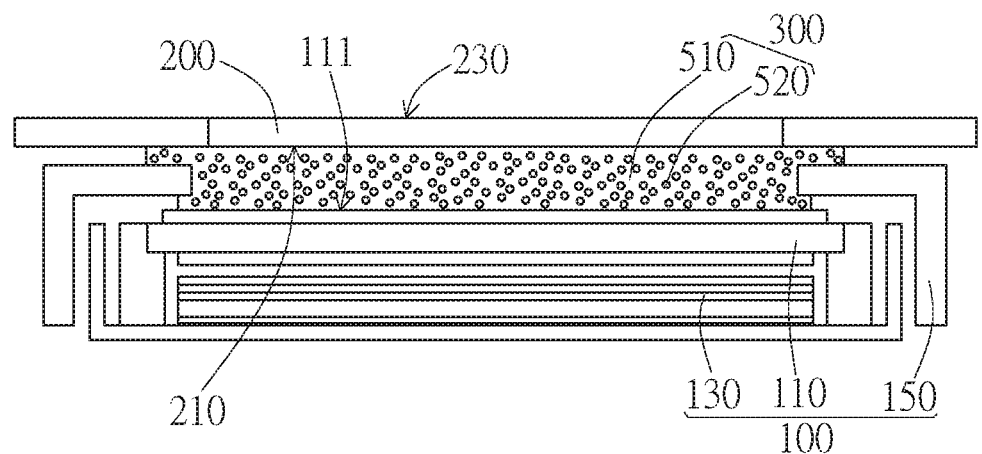
FIG. 1 is a sectional view of a display device in an embodiment.

The connecting elements according to the present invention will be described in detail below through embodiments and with reference to the accompanying drawings. A person having ordinary skill in the art may understand the advantages and effects of the present disclosure through the contents disclosed in the present specification. However, the contents shown in the following sentences never limit the scope of the present disclosure. Without departing from the conception principles of the present invention, a person having ordinary skill in the present art may realize the present disclosure through other embodiments based on different views and applications. In the attached FIGS., for the purpose of clarification, the thicknesses of layers, films, panels, regions and the like are amplified. In the whole specification, the same marks represent the same element. It should be understood that, when an element such as a layer, a film, a panel, a region or a substrate are described as "being on" or "being connected to" another element, they may be directly on or connected to another element, or there may be other elements therebetween. On other hands, when an element is described as "directly exists on another element" or "directly connects to" another element, there is no element therebetween. As used in the present specification, a "connection" may be a physical and/or electrical connection. In addition, an "electrical connection" or "coupling" means that other elements may exist therebetween.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

In addition, relative terms such as "lower" or "bottom" and "on" or "top" may be used to describe the relationship between an element and another element in the present specification, as shown in the FIGS. It should be understood that, the purpose of using relative terms is to include the different directions of the devices not shown in the FIGS. For example, if a device in an attached FIG is turned upside down, an element described as being "under" another element will be "on top of" that element. Therefore, a descriptive term "under" may include the meaning of both "under" and "on top of", depending on the specific orientation of the attached FIG.

The terms "about", "approximate" or "essentially" used in the present specification include the value itself and the average values within the acceptable range of deviation of the specific values confirmed by a person having ordinary skill in the present art, considering the specific measurement discussed and the amount of errors related to such measurement (that is, the limitation of the measurement system). For example, "about" may mean within one or more standard deviations of the value itself, or within ±30%, ±20%, ±10%, ±5%. In addition, "about", "approximate" or "essentially" used in the present specification may select a more acceptable range of deviation or standard deviation based on optical property, etching property or other properties. One cannot apply one standard deviation to all properties.

The present disclosure provides a display device and method of manufacturing thereof. The display device may be a non-self-luminous display device or a self-luminous display device. The non-self-luminous display device, for example, may be a liquid crystal display device, an electrophoretic display device, a reflective display device, a see-through display device, and the like. The self-luminous display device, for example, may be an organic light-emitting diode, a micro LED display device, and the like.

FIG. 1 illustrates a display device in an embodiment. In the present embodiment, the display device includes a display module 100 and a light transmissible panel 200. As shown in FIG. 1, the display module 100 is a liquid crystal display module and has a display panel 110 and a backlight module 130 disposed on the back side of the display panel 110. However, in another embodiment, the display module 100 may also be another type of display module such as an organic light-emitting diode display module or an electrophoresis display module. In the present embodiment, the display module 100 further includes a front frame 150, wherein the front frame 150 is disposed on the side of the display panel 110 having a display surface 111 so as to provide the display module 100 with functions such as positioning and protection. However, in another embodiment, the front frame 150 may also be not disposed, or may be replaced by other components such as tapes.

As shown in FIG. 1, the light transmissible panel 200 is disposed on the side of the display panel 110 having the display surface 111, and overlapped with the display module 100 each other. In the present embodiment, the light transmissible panel is a touch panel; however, in another embodiment, the light transmissible panel 200 may also be another display panel, a protection layer, or other optical element layers. In addition, the backlight module 130 disposed on the back side of the display panel 110 may provide a backlight. The backlight projects towards the outside via the display panel 110 and the light transmissible panel 200 so as to display images.

As shown in FIG. 1, a light transmissible layer 300 is disposed between the light transmissible panel 200 and the display panel 110. In the present embodiment, the light transmissible layer 300 is a lamella, for example, which may be formed by curing a liquid optical glue. Therefore two opposite sides of the light transmissible layer 300 are respectively attached to a surface of a display side of the display panel 110 and an inner surface 210 of the light transmissible panel 200. By disposing the light transmissible layer 300, the light transmissible panel 200 may be connected to the display panel 110 so as to determine the relative location therebetween.

In the present embodiment, the light transmissible layer 300 is mainly formed by a first material; however, in another embodiment, the first material may also be included in the light transmissible layer 300 by different ways such as blending. The first material, for example, may be an organic silicone rubber, an acrylic resin, an unsaturated polyester, a polyurethane, an epoxy resin and the like, but not limited thereto. Within a certain amount of time, for example, a few seconds, a few minutes, a few hours, or a few days after being exposed under a light of the first wavelength range, the color of the first material will be transformed from a first color to a second color. In the present embodiment, the first color, for example, may be white or colorless, and the second color, for example, may be yellow or red; in other words, the first color transformation may be a color transformation to yellow or red. The light of the first wavelength range, for example, may be an Infrared light, a visible light and/or ultraviolet irradiation, and the wavelength thereof, for example, ranges from 300 nm to 3000 nm. The reason for the first material generating the first color transformation, for example, may be the absorption spectrum of materials being affected due to photochemical change after being exposed under the light so as to generate the color transformation.

Figure 2:
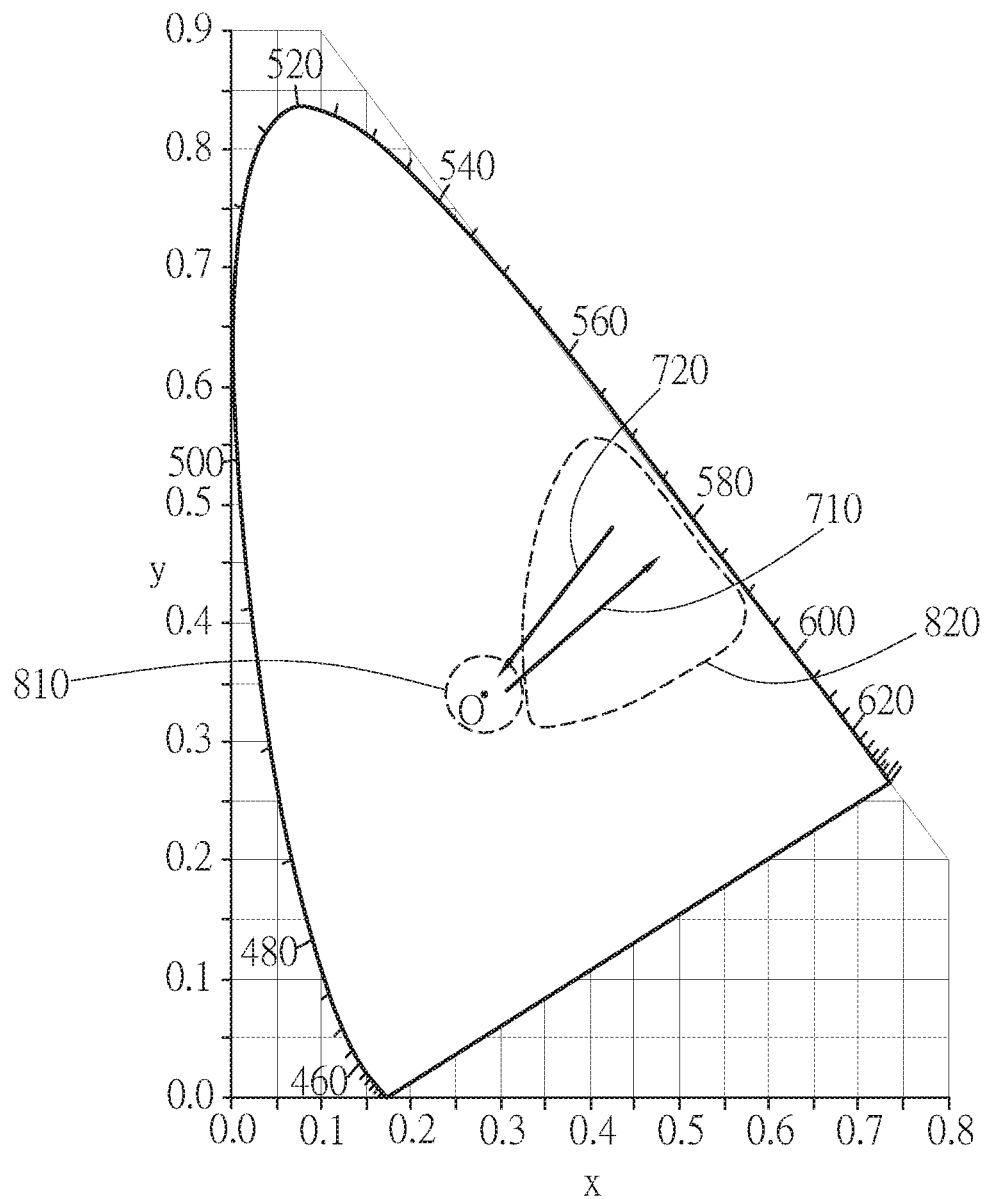
FIG. 2 is a diagram of a first color transformation and a second color transformation in a color space in an embodiment.

As shown in FIG. 1, a second material 520 is blended in the light transmissible layer 300. Within a certain amount of time, such as a few seconds, a few minutes, a few hours, or a few days after being exposed under the light of the first wavelength range, the color of the second material 520 will generate a transformation from the second color to the first color; in other words, as shown in FIG. 2, the second color transformation and the first color transformation are approximately opposite color transformations. The so-called trend of color transformation, for example, indicates the shift from a color area to another color area in a color space, and not limited to a shift from a chromaticity coordinates to another chromaticity coordinates. In a CIE1931 color space shown as FIG. 2, a first color area 810, for example, may be an area of white color, and a second color area 820, for example, may be an area of yellow color, wherein the first color transformation 710 and the second color transformation 720 are generated between the aforementioned two areas, and the trajectories thereof are not necessarily parallel or overlapped in the color space. The second material 520, for example, may be a material capable of generating color fading by mechanisms such as photolysis degradation, photolysis synthesis, or photolysis sensitization. Its compositions, for example, may be selected from one of sulfur dyes, vat dyes, and degradable aromatic amine dyes, but not limited thereto. The second color transformation, for example, may be a color transformation generated by color fading.

Figure 3:
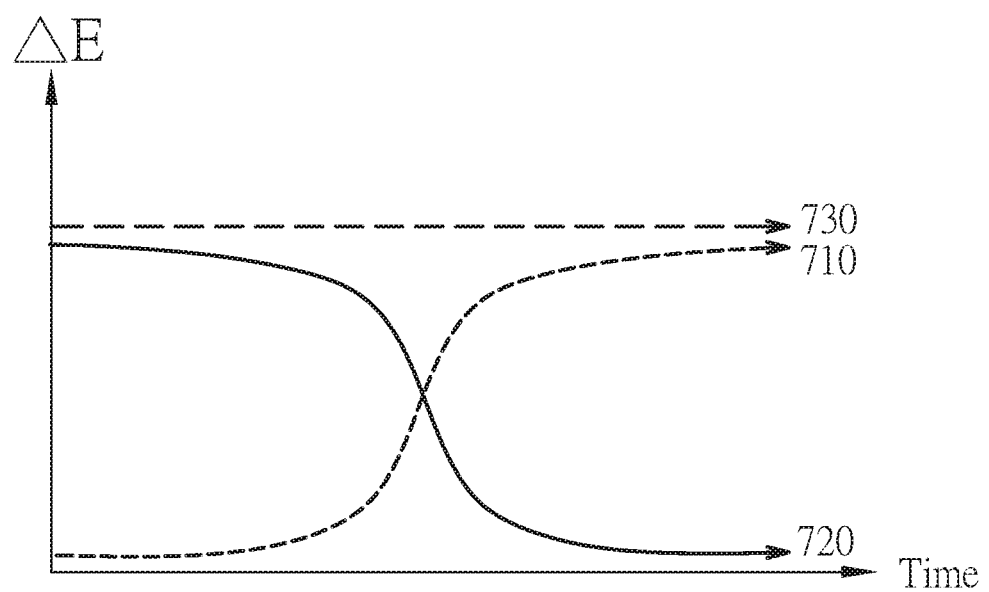
FIG. 3 is a diagram of the first color transformation and the second color transformation in another embodiment.

In an embodiment, the first color transformation and the second color transformation are complimentary in their trends. For example, in the embodiment shown in FIG. 3, the x-axis represents time, and the y-axis represents the value of Euclidean distance (ΔE) from a white color reference in a Lab color space. In FIG. 3, the curve 710 represents the first color transformation, and the curve 720 represents the second color transformation. The value ΔE of the curve 710 increases as time progresses, representing that the distance from the color white increases gradually, and the color shift is more and more pronounced. On the other hand, the value ΔE of the second color transformation (the curve 720) decreases gradually as time progresses, representing that the distance from the color white decreases gradually, and the color shift decreases gradually. For example, when the first material and the second material are mixed or overlapped in their distribution area, the light needs to be projected towards the outside after traveling through both materials; that is, an overlapping effect of the curve 710 and the curve 720 will be generated for users, as shown in the curve 730. The amplitude of change of the value ΔE generated in the color along with the time progression will slow down substantially. Therefore, users do not easily notice the visual differences caused by the color shift. Therefore, when the first material in the display device generates color shift due to irradiation by ambient lights or inner backlights, such color shift may be compensated by disposing the second material and the corresponding color transformations thereof will decrease the effects on the outward appearance of products in addition to image qualities.

In addition, regarding the trend of transformation, the first color transformation (the curve 710) is slow in the first section and the last section, and quick in the middle section. Similarly, the second color transformation (the curve 720) is slow in the first section and the last section, and quick in middle section. Therefore, when both curves are overlapped to form the curve 73, a gentle trend may be achieved. As seen from another view point, if the first material and the second material have a mid-position in the coordinates of a Lab color space, the changes of the color shift of the mid-position is half times that of the curve 730. In an embodiment, a variation of Euclidean distance ($\Delta E$) of the mid-position with respect to a white color reference is smaller than 6 so that users do not easily feel color transformations due to the display device being exposed under the light.

As mentioned above, in the present embodiment, the backlight module is disposed so as to provide a backlight. As shown in FIG. 1, since the second material 520 is blended in the light transmissible layer 300, therefore, the backlight module 130 is disposed on the same side as the light transmissible layer 300 and the second material 520. The backlight generated by the backlight module 130 are projected outwards after passing through the light transmissible layer 300 and the second material 520 so as to form an image. In the present embodiment, the backlight has a color shift towards a third color with respect to a white light, wherein the third color, for example, may be blue. As seen from the CIE1931 color space illustrated in FIG. 4, a third color area 830 and the second color area 820 are located at different sides of a white color reference O. Since the first material and the second material 520 will be mixed together to generate a color closer to the second color with respect to white light, therefore, the backlight may immediately generate a color closer to a white color after harmonizing the color of the backlight closer to a blue color and the colors of the first material and the second material when the backlight passes through the first material and the second material to be projected outward.

Figure 4:
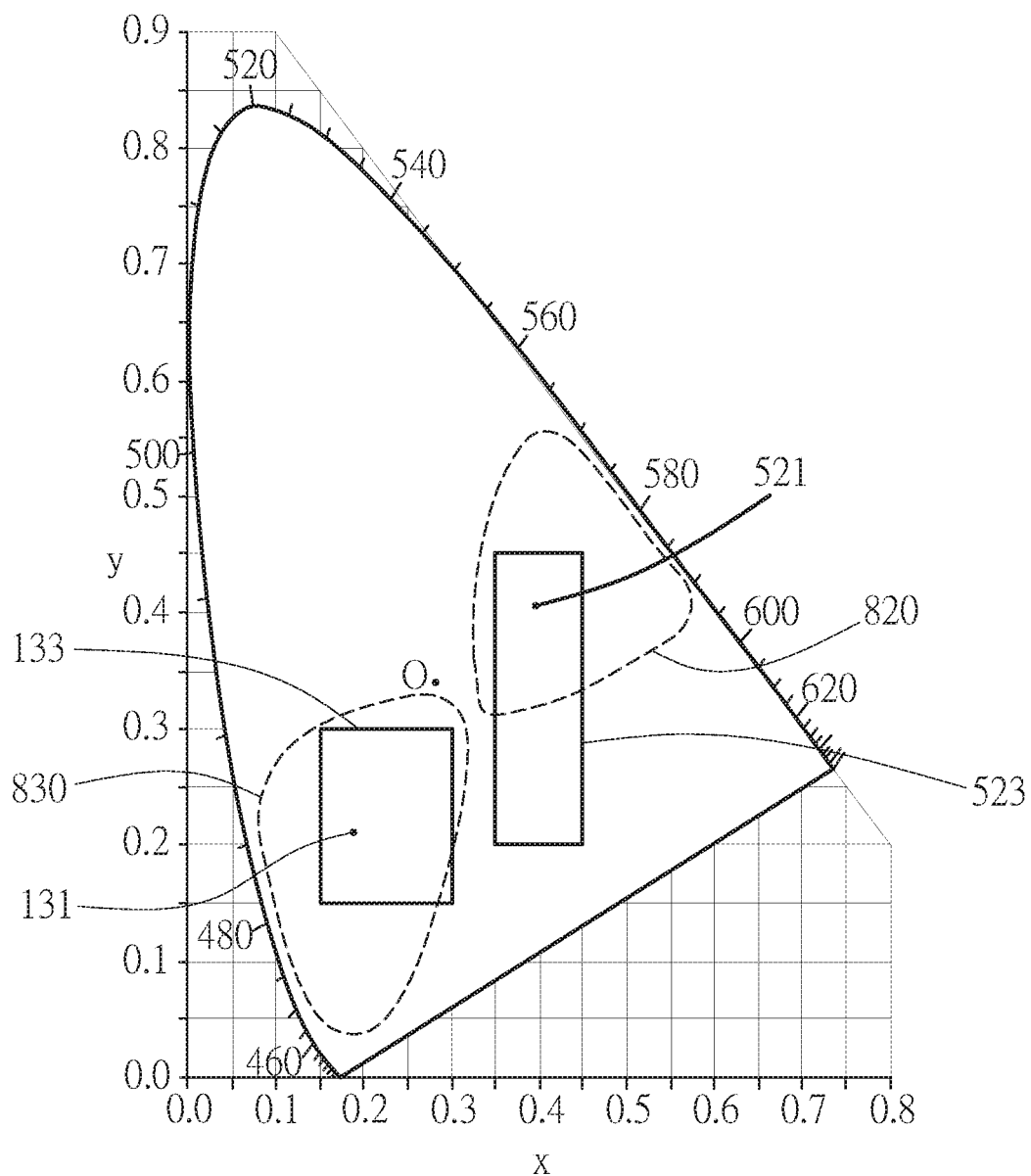
FIG. 4 is a diagram of a backlight chromaticity coordinates in a color space in an embodiment.

Specifically, in the present embodiment, the backlight has a backlight chromaticity coordinates 131 in the color space illustrated in FIG. 4, which falls into a backlight chromaticity coordinates area 133. The x-coordinate of the backlight chromaticity coordinates area 133 ranges from 0.15 to 0.3; the y-coordinate also ranges from 0.15 to 0.3. In addition, the second material has an original chromaticity coordinates 521 in the color space illustrated in FIG. 4, which falls into an original chromaticity coordinates area 523. The x-coordinate of the original chromaticity coordinates area 523 ranges from 0.35 to 0.45; the y-coordinate ranges from 0.2 to 0.45. The original chromaticity coordinates 521, for example, may be the chromaticity coordinates of the second material before being exposed under the light of the first wavelength range or after being exposed under the light of the first wavelength range for a short time.

Figure 5:
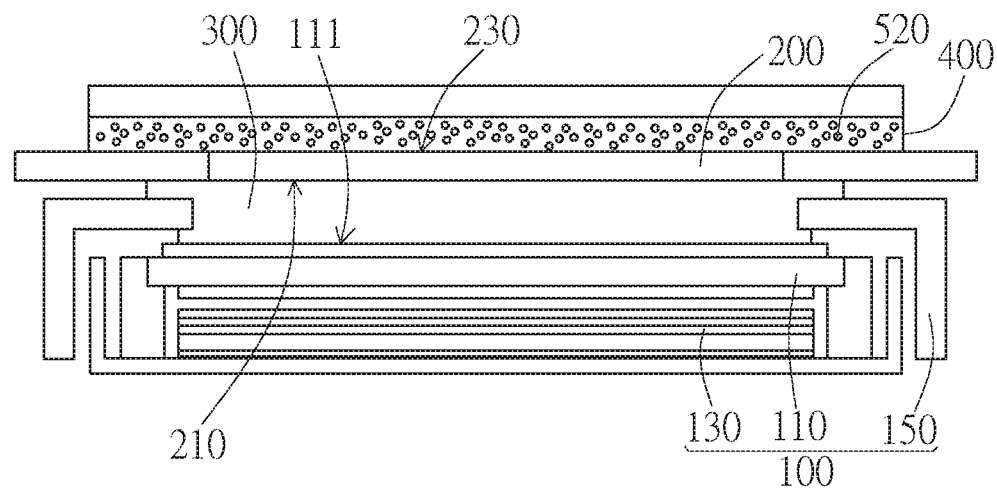
FIG. 5 is a sectional view of the display device in another embodiment.

In the embodiment illustrated in FIG. 5, an optical element layer 400 is further included. In the present embodiment, the optical element layer 400 is disposed on an outer face 230 of the light transmissible panel 200. The second material 520 is disposed in the optical element layer 400, and not blended in the light transmissible layer 300. But the first material still exists in the light transmissible layer 300. In other words, in the present embodiment, the second material 520 has a projection area on the light transmissible layer 300 at least partially overlapped with the light transmissible layer 300 so that the reflection of the backlight or the ambient light is projected outward after passing through the second material 520 and the first material. The optical element layer 400 may be a hardening protective layer, but may also be a transparent layer with other optical effects or without any optical effects.

Figure 6:
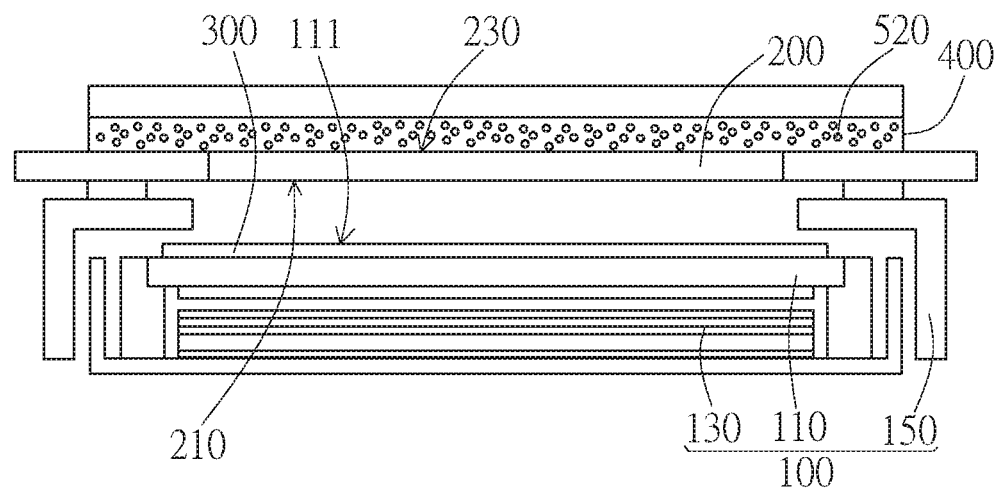
FIG. 6 is a sectional view of the display device in another embodiment.

FIG. 6 illustrates a display device in another embodiment. In the present embodiment, a glue may not exist between the display panel 110 and the light transmissible panel 200, and an air layer may exist therebetween. Wherein the light transmissible layer 300 is disposed on a display device 100; for example, it may be a polarizer attached to the display panel 110. In addition, in another embodiment, the light transmissible layer 300 may also be the other optical film in the display device 100. As shown in FIG. 6, the optical element layer 400 is disposed on the outer face 230 of the light transmissible panel 200. The second material 520 is disposed in the optical element layer 400 and not blended in the light transmissible layer 300, but the first material still exists in the light transmissible layer 300. However, in another embodiment, the optical element layer 400 may also be disposed on the inner face 210 of the light transmissible panel 200. In addition, the optical element layer 400 may also be disposed in the display device 100; for example, it may be treated as a polarizer of the display panel 110 or an optical film in the backlight module 130.

An embodiment of the present embodiment also provides a method of manufacturing the display device. Steps of the present embodiment may include: disposing a light transmissible layer which includes the first material. Specifically, in this step, the first material may be treated as the main substrate of the light transmissible layer, or the first material is added to a substrate of the light transmissible layer by a mean, such as blending or doping. The light transmissible layer may be an optical cement connecting light transmissible panels such as the display panel and the touch panel, and may also be an element in the display panel and the backlight module, such as a polarizing film or an optical film.

The other step of the present embodiment is as follows: disposing the second material in the light transmissible layer or disposing the second material to have a projection area at least partially overlapped with the light transmissible layer. In other words, the second material may be disposed in the light transmissible layer so as to be directly blended in the first material, or the second material may be added in another layer. Since the features of the first material and the second material have been described above, they will not be described again here. Since color transformations after the first material and the second material are exposed under the light may compensate each other, the color shift due to the changes occurred in the materials caused by exposure under the light may be decreased.

In another embodiment, the method of manufacturing may also include the following steps: disposing the backlight module on the same side as the light transmissible layer and the second material so that a backlight generated by the backlight module may pass through the light transmissible layer and the second material; and modulating the backlight to have a color shift towards a third color with respect to a white light. The third color and the second color are located at different sides of a white color reference in the color space, wherein the third color, for example, may be blue, and the second color, for example, may be yellow. For example, if the second color is yellow, since the second material will have a yellowish color before being exposed under the light of the first wavelength range so as to make the whole image have a yellowish color. It is possible to make a compensatory effect and to decrease the level of color shift of the image by modulating the backlight to have a bluish color.

Through the aforementioned disposition, since the second color transformation of the second material may provide the first color transformation of the first material with compensation, therefore, visual effects of color transformation generated by the first material being exposed under the light in the display device may be decreased. The present disclosure is described in detail with reference to the aforementioned embodiment; however, the aforementioned description merely represents the exemplary embodiments of the present invention. It should be noted that the aforementioned embodiment is not intended to limit the scope of the present disclosure thereto. On the other hand, equivalent changes, alternations modifications based on the claims of the present disclosure are viewed as being embraced by the scope of the present disclosure.

What is claimed is:

1. A display device, comprising:
    a light transmissible layer including a first material; and
    a second material either included in the light transmissible layer or having a projective area on the light transmissible layer at least partially overlapped with the light transmissible layer;
    wherein the first material is configured to generate a first color transformation from a first color to a second color after being exposed under a first wavelength range light, and
    wherein the second material is configured to generate a second color transformation from the second color to the first color after being exposed under the first wavelength range light,
    wherein the first material and the second material have a mid-position in a coordinate of a Lab color space, and a variation of Euclidean distance ($\Delta E$) of the mid-position with respect to a white color reference is smaller than 6 during the first color transformation and the second color transformation generated under irradiation of the first wavelength range light.

2. The display device according to claim 1, wherein the first color transformation is changed to yellow or red.

3. The display device according to claim 1, wherein the second color transformation is color fading.

4. The display device according to claim 1, further comprising a backlight module disposed on a same side as the light transmissible layer and the second material, wherein the backlight module generating a backlight passing through the light transmissible layer and the second material,
    wherein the backlight has a color shift toward a third color with respect to a white light, and the third color and the second color are located at different sides of a white color reference in a color space.

5. The display device according to claim 4, wherein the second color is yellow, the third color is blue.

6. The display device according to claim 5, wherein the color space is CIE1931 color space, the backlight has a backlight chromaticity coordinate in the color space, an x-coordinate value of the backlight chromaticity coordinate ranges from 0.15 to 0.3, and a y-coordinate value of the backlight chromaticity coordinate ranges from 0.15 to 0.3.

7. The display device according to claim 5, wherein the color space is CIE1931 color space, the second material has an original chromaticity coordinate in the color space, an x-coordinate value of the original chromaticity coordinate ranges from 0.3 to 0.45, and a y-coordinate value of the original chromaticity coordinate ranges from 0.2 to 0.45.

8. The display device according to claim 1, wherein the second material is selected from a material generating color fading by photolysis degradation, photolysis synthesis, or photolysis sensitization.

9. The display device according to claim 1, wherein the second material is selected from one of sulfur dyes, vat dyes, and degradable aromatic amine dyes.

10. The display device according to claim 1, further comprising:
    a display panel having a display surface, wherein the light transmissible layer is attached on the display surface; and
    a transmissive panel having an inner face, the inner face attached on a surface of the light transmissible layer opposite to the display surface.

11. The display device according to claim 10, further comprising an optical element layer covering an outer face of the transmissive panel opposite to the inner face, wherein the second material is included in the optical element layer.

12. The display device according to claim 1, further comprising:
    a display panel having a display surface, wherein the light transmissible layer is disposed on the display panel;
    a transmissive panel having an inner face and an outer face opposite to each other, the inner face facing the display surface; and
    an optical element layer attached on the inner face or the outer face;
    wherein the second material is included in the optical element layer.

13. A method of manufacturing a display device, comprising:
    disposing a light transmissible layer including a first material, wherein the first material is configured to generate a first color transformation from a first color to a second color after being exposed under a first wavelength range light: and
    disposing a second material in the light transmissible layer or disposing to have a projection area on the light transmissible layer at least partially overlapped with the light transmissible layer, wherein the second material is configured to generate a second color transformation from the second color to the first color after being exposed under the first wavelength range light,
    wherein the first material and the second material have a mid-position in a coordinate of in a Lab color space, the step of disposing the second material includes: selecting the second material so that a variation of Euclidean distance ($\Delta E$) of the mid-position with respect to a white color reference is smaller than 6 during the first color transformation and the second color transformation generated under irradiation of the first wavelength range light.

14. The method according to claim 13, further comprising following steps:
    disposing a backlight module on a same side as the light transmissible layer and the second material, wherein the backlight module is configured to generate a backlight passing through the light transmissible layer and the second material; and modulating the backlight to have a color shift toward a third color with respect to a white light, wherein the third color and the second color are located at different sides of a white color reference in a color space.

15. The method according to claim 14, wherein the color space is CIE1931 color space, the backlight has a backlight chromaticity coordinate in the color space, the step of modulating the backlight includes: modulating an x-coordinate value of the backlight chromaticity coordinate to range from 0.15 to 0.3, and modulating a y-coordinate value of the backlight chromaticity coordinate to range from 0.15 to 0.3.

16. The display device according to claim 14, wherein the color space is CIE1931 color space, the second material has an original chromaticity coordinate in the color space, an x-coordinate value of the original chromaticity coordinate ranges from 0.3 to 0.45, and a y-coordinate value of the original chromaticity coordinate ranges from 0.2 to 0.45.

17. The method according to claim 13, wherein the step of disposing the transmissive layer includes:
disposing the light transmissible layer attached on a display surface of a display panel; and
disposing a transmissive panel so that an inner face of the transmissive panel is attached on a surface of the light transmissible layer opposite to the display surface.

18. A display device, comprising:
a light transmissible layer including a first material; and
a second material either included in the light transmissible layer or having a projective area on the light transmissible layer at least partially overlapped with the light transmissible layer; and
a backlight module disposed on a same side as the light transmissible layer and the second material, wherein the backlight module generating a backlight passing through the light transmissible layer and the second material,
wherein the first material is configured to generate a first color transformation from a first color to a second color after being exposed under a first wavelength range light, and
wherein the second material is configured to generate a second color transformation from the second color to the first color after being exposed under the first wavelength range light,
wherein the backlight has a color shift toward a third color with respect to a white light, and the third color and the second color are located at different sides of a white color reference in a color space,
wherein the second color is yellow, the third color is blue, and
wherein the color space is CIE1931 color space, the second material has an original chromaticity coordinate in the color space, an x-coordinate value of the original chromaticity coordinate ranges from 0.3 to 0.45, and a y-coordinate value of the original chromaticity coordinate ranges from 0.2 to 0.45.

19. A method of manufacturing a display device, comprising:
disposing a light transmissible layer including a first material, wherein the first material is configured to generate a first color transformation from a first color to a second color after being exposed under a first wavelength range light: and
disposing a second material in the light transmissible layer or disposing to have a projection area on the light transmissible layer at least partially overlapped with the light transmissible layer, wherein the second material is configured to generate a second color transformation from the second color to the first color after being exposed under the first wavelength range light;
disposing a backlight module on a same side as the light transmissible layer and the second material, wherein the backlight module is configured to generate a backlight passing through the light transmissible layer and the second material; and
modulating the backlight to have a color shift toward a third color with respect to a white light, wherein the third color and the second color are located at different sides of a white color reference in a color space, and
wherein the color space is CIE1931 color space, the second material has an original chromaticity coordinate in the color space, an x-coordinate value of the original chromaticity coordinate ranges from 0.3 to 0.45, and a y-coordinate value of the original chromaticity coordinate ranges from 0.2 to 0.45.

* * * * *